United States Patent [19]

Wydeven et al.

[11] 4,456,708

[45] Jun. 26, 1984

[54] METHOD FOR THE PREPARATION OF THIN-SKINNED ASYMMETRIC REVERSE OSMOSIS MEMBRANES AND PRODUCTS THEREOF

[75] Inventors: Theodore J. Wydeven, Sunnyvale, Calif.; Moshe G. Katz, Givataim, Israel

[73] Assignee: The United States of America as represented by the Administrator of the National Aeronautics and Space Administration, Washington, D.C.

[21] Appl. No.: 392,092

[22] Filed: Jun. 25, 1982

[51] Int. Cl.³ .............................................. C08F 16/06
[52] U.S. Cl. .................................... 521/141; 521/142; 521/149; 264/41
[58] Field of Search ....................... 521/141, 142, 149; 264/41

[56] References Cited

U.S. PATENT DOCUMENTS

| | | | |
|---|---|---|---|
| 3,318,856 | 5/1967 | Deyrup | 521/141 |
| 3,481,888 | 12/1969 | Sinclair | 521/141 |
| 3,591,543 | 7/1971 | Stafford | 521/141 |
| 3,992,495 | 11/1976 | Sano et al. | 521/141 |
| 4,073,733 | 2/1978 | Yamauchi et al. | 521/141 |
| 4,279,752 | 7/1981 | Sueoka et al. | 521/141 |

*Primary Examiner*—Joseph L. Schofer
*Assistant Examiner*—Bernard Lipman
*Attorney, Agent, or Firm*—Darrell G. Brekke; John R. Manning; Robert D. Marchant

[57] ABSTRACT

A method for preparing water-insoluble asymmetric reverse osmosis membranes from water-soluble polymers is disclosed. The method involves casting a polymer film, partially drying it and then contacting it with a transition metal polyvalent ion solution. Optionally, the product of the contacting is cross-linked such as by radiation or heat. The membrane products are disclosed as well.

16 Claims, 1 Drawing Figure

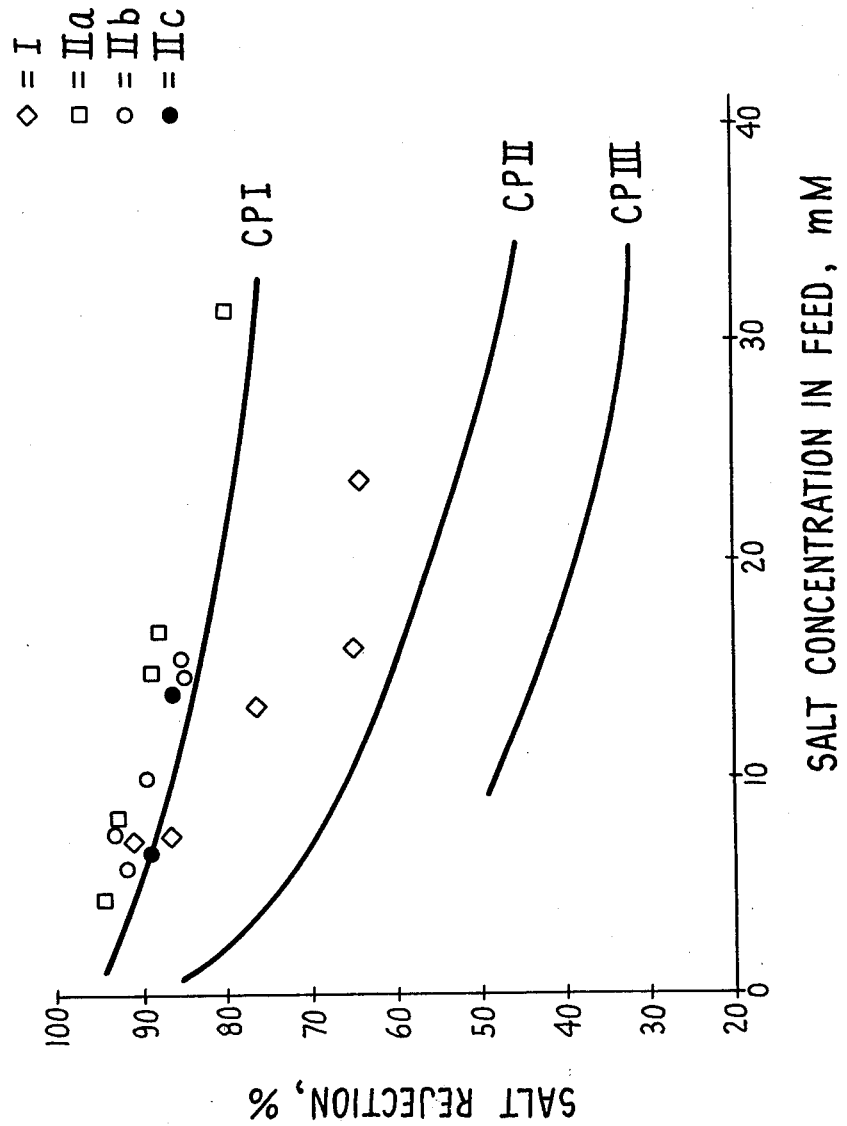

METHOD FOR THE PREPARATION OF THIN-SKINNED ASYMMETRIC REVERSE OSMOSIS MEMBRANES AND PRODUCTS THEREOF

ORIGIN OF THE INVENTION

The invention described herein was made in the performance of work under a NASA contract and is subject to the provisions of Section 305 of the National Aeronautics and Space Act of 1958, Public Law 85-568 (72 Stat 435; 42 U.S.C. 2457).

TECHNICAL FIELD

This invention is in the field of synthetic membranes, especially synthetic reverse osmosis membranes. More particularly, it is an improved process for preparing water-insoluble thin-skinned asymmetric reverse osmosis membranes from water-soluble polymer feedstocks.

THE PRIOR ART

In the early 1960s, Drs. Loeb and Sourirajan formulated the first practical reverse osmosis desalination membranes. (See, for example, *Adv. Chem. Ser.*, 38, 117 (1962) and U.S. Pat. Nos. 3,133,137 and 3,170,867). They worked with cellulose acetate, membranes. Membrane structure has been studied and it is recognized to be advantageous to have an "asymmetric" membrane. An asymmetric membrane is a membrane which in cross-section presents a "thin skin" of lower permeability material intimately supported on a thicker layer of a higher permeability material. These two layers can be chemically different. Often the two layers are chemically identical but differ in density, compactness or the like. Since the discovery of Loeb-Sourirajan considerable research efforts have been dedicated to the development of new types of reverse osmosis membranes. Different materials have been investigated to overcome certain limitations of the cellulosic membranes. Several hydrophilic and even water-soluble materials such as poly(vinyl alcohol) (PVA) partially hydrolyzed poly(vinyl acetate) and poly(ethyleneimine) and the like have been proposed.

In general, the hydrophilic water-soluble polymer-based membranes give high water permeabilities but poor salt selectivity. (Michelson and Harriot, *J. Appl. Polymer Sci., Appl. Polymer Symp.*, 13, 27 (1970)). The materials have the special attraction of having outstanding chemical stability vis a vis conventional cellulose acetate, poly(vinyl butyral) and the like. So there is a real interest in trying to improve their reverse osmosis performance and preparation.

Several attempts to improve the reverse osmosis characteristics of PVA membranes by various treatments have been reported in the literature. (See Chen, et al, *J. Appl. Polymer Sci.*, 17, 780 (1973); Dick, et al, *Desalination*, 17, 239 (1975) and Peter, et al, *Desalination*, 19, 161 (1976).

The patent art also reflects widespread study of reverse osmosis membrane production. For example, U.S. Pat. No. 3,907,675 of Chapurlat discloses covalently crosslinking poly(vinyl alcohol) with a diisocyanate cross-linking agent. Cadotte in U.S. Pat. No. 4,039,440 shows a reverse osmosis membrane prepared by covalent reaction of a polyethyleneimine film with an acid chloride or isocyanate group containing cross-linking agent. In addition, two older patents which are to be found outside the reverse osmosis field relate to forming poly(vinyl alcohol) films apparently as photo film material. Noble's U.S. Pat. No. 2,419,281 discloses such films, while Sargent, et al's U.S. Pat. No. 2,671,022 specifically teaches that beryllium compounds and boron compounds will react with poly(vinyl alcohol) in the presence of base to form a gel. This reaction is shown to be very specific. A wide range of other metals are shown to not work. Metal ion addition to previously organic cross-linked poly(vinyl alcohol) films is shown in Peter, et al, *Proc. 6th Intern. Symp., Fresh Water from the Sea*, 3, 239–46 (1978).

STATEMENT OF THE INVENTION

An improved method for preparing thin-skinned asymmetric water-insoluble reverse osmosis membranes from water-soluble polymers has now been found. This method comprises the steps of:

(a) casting a film of water-soluble polymer from a water solvented casting solution;

(b) partially evaporating the water solvent to form a thin-skinned asymmetric structured partially dehydrated film; and (c) further developing and fixing the asymmetric structure by immersing the partially dehydrated film in an aqueous complexing bath comprising polyvalent transition metal ions and thereafter recovering the film from the complexing bath.

In another aspect, this invention concerns the polyvalent transition metal-ion-fixed thin-skinned asymmetric membranes produced by this process.

BRIEF DESCRIPTION OF THE DRAWING

In the drawing, the sole FIGURE is a graph illustrating improved salt rejections observed using the membranes of this invention in desalination processes.

DETAILED DESCRIPTION OF THE INVENTION

The water-insoluble membranes formed according to this invention are based on water-soluble polymers. These include homopolymers and copolymers having amine and/or hydroxyl functionality, for example, polymers having recurring vinyl alcohol, vinyl amine, ethyleneimine, vinyl pyrrolidone or ethylene glycol repeat units. Most preferred membranes are based on poly(vinyl alcohol). Other preferred membranes include partially hydrolyzed poly(vinyl acetate) that is vinyl acetate-vinyl alcohol copolymers especially containing from 25 to 100 mer % of vinyl alcohol groups. Poly(ethyleneimine), poly(vinylpyrrolidones) and poly(vinylamine) and their copolymers may also be used as may poly(ethylene glycols) and vinyl alcohol copolymers with vinyl ethers, and the vinyl esters beyond vinyl acetate and the like.

These polymers usually have average molecular weights above about 10,000 and preferably above 20,000, very preferably from 25,000 to $2.5 \times 10^6$ and most preferably from 30,000 to 300,000. These molecular weights may be determined by gel permeation chromatography or the like.

The metal ions which insolubilize the membranes are selected from the polyvalent transition metal ions that form stable complexes. These include precious and nonprecious polyvalent metal ions found in Groups VIB, VIIB, VIII, IB and IIB of Periods 4, 5 and 6 of the Periodic Table of the Elements.

Preferably metal ions having relatively low toxicity are used, especially if the membranes are to be used for generating potable water.

Useful metal ions include the polyvalent ions of iron, cobalt, nickel, ruthenium, rubidium, palladium, osmium, iridium, platinum, copper, zinc, chromium, manganese and cadmium. $Cu^{++}$ is especially preferred. These metal ions are presented as their water-soluble salts—generally their water-soluble inorganic salts such as sulfates, halides, nitrates, or the like. Organic salts, if sufficiently water-soluble, can be employed. It is important to remember that the polymer film before insolubilization is water-soluble so that if a dilute metal ion solution is employed the polymer film may dissolve before ion complexing is achieved. Preferably the metal solution contains at least 3% by weight of the salt that supplies the metal ion. More preferably, the solutions contain from 8% to 40% by weight of the salt. A most preferred metal ion solution comprises a saturated copper sulfate solution.

The process of the invention contains at least 3 steps and, as will be shown, may involve additional steps.

In the first step, a thin layer of the water-soluble polymer is cast from a water-solvented casting solution. Although the thickness of the polymer layer is not considered to be critical to the practice of this invention, in general, the layer is from about 1 micron to about 200 microns and preferably from about 2 microns to 100 microns and most preferably from 5 microns to 50 microns thick. Thinner membranes are difficult to handle and thicker membranes tend to have less usefulness in desired reverse osmosis applications.

The casting is carried out in conventional apparatuses. For example, on a laboratory scale a manual doctor blade may be used while on a commercial scale, an automated continuous casting machine may be employed.

The solvent of the casting solution is an aqueous solvent such as pure water as well as water admixed with up to about 25% by weight of water-miscible organic liquids such as lower alcohols or ketones. It must be emphasized that water is the primary liquid in this solution and in the salt solution later employed. Unlike prior art processes, this process does not rely upon addition of a nonsolvent to precipitate out or gel the polymer. Here, all solutions involved are water solvented.

The solution of water-soluble polymer is relatively concentrated—generally containing from about 2% by weight to saturation of the polymer. Preferably, it contains from 5% to saturation of the polymer. With preferred poly(vinyl) alcohols) concentrations of from about 5% to 15% are generally preferred.

In the second step, the above-formed thin layer is partially dehydrated. This is a quick step, generally taking from about 5 to 2,000 seconds. This dehydration may be carried out with the layer in place on its casting surface. This permits the dehydration to take place on one side of the layer only. The dehydration may be carried out in air at ambient temperatures and humidities, although at extremely high humidities, i.e. 95% or greater, it may be of advantage to partially dry the air. Elevated temperatures, i.e. up to 100° C. may be employed. This dehydration is not a classic heat-annealing nor a complete drying of the membrane. It does not cause insolubilization. It is believed, however, that it does impart the desired asymmetric "skinned" structure to the film as longer dehydration periods give relatively more dense —more restrictive membranes. Preferred dehydration times are in the range of 10 to 1,000 seconds at conditions of about 15° C. to 100° C. and 25% to 75% humidity. Times of 20 to 500 seconds and temperatures of 15° C. to 50° C. are most preferred. The product of this dehydration step is a water-soluble asymmetric membrane which can be and generally is removed from the casting surface.

The third step involves contacting the membrane produced in the second step with the aqueous complexing bath. The constitution of the bath, water and transition metal ions, has already been outlined. This contacting can be effected by immersion of the film in the bath, spraying an excess of the bath on the film or the like. Immersion is generally the method of choice. The contacting is for a relatively prolonged period, such as a period greater than 2 hours. Times of from 5 to 800 hours and especially 10 to 400 hours are preferred.

The product of this immersion is the insolubilized membrane of this invention. It comprises the polymer film in complex combination with the metal ions of the insolubilizing transition metal ions.

This product may be further treated. For example, it may be washed to remove noncomplexed metal ions and residues of the complexing bath. It also may be given non-chemical cross-linking post treatment. This may be accomplished by heat or radiation or the like. The radiation treatment can be carried out along the lines and with the conditions we reported in the *Journal of Applied Polymer Science* Vol. 26, No. 9, pp. 2935–46 (Sept., 1981) which is incorporated herein by reference. Doses in the range of 0.5–40 Mrad at a dose rate of 35–350 krad/hour give good results. Other equivalent radiation techniques such as UV radiation cross-linking, electron beam cross-linking or plasma cross-linking may also be employed.

Thermal treatment, such as exposures to 100° C.–225° C. for 2 to 200 minutes also can effect cross-linking. Preferred thermal treatments are in the range of 135° C. to 200° C. for 5 to 100 minutes. This heat treating is along the lines we reported in *Journal of Applied Polymer Science*, Vol. 27, 79–87 (1982) with nonmetal complexed polyvinyl alcohol. This article is incorporated herein by reference.

The product of this treatment is a membrane very preferably having an overall thickness of 4 to 25 microns and a skin thickness of from about 250 to 1,000 angstroms. These membranes may be stored in a dry state rather than in a hydrated state. Such a membrane is characterized as having a high water flux and relatively higher than conventional (for hydrophilic membranes) salt rejections when tested as a reverse osmosis membrane. Accordingly, the products can find application as reverse osmosis membranes for purifying or desalinating sea water, brackish water or industrial or domestic waste water. Of course, they can be employed in other semipermeable membrane processes, such as analytical processes, or the like such as is known to the art.

The invention will be further described by the following Examples. These are provided only to illustrate the invention and are not to be construed as limiting its scope.

EXAMPLE I

A 9% solution of poly(vinyl alcohol) homopolymer (100% hydrolyzed poly(vinyl acetate)) in water was prepared. The polymer had an average molecular weight of 115,000 daltons. This solution was cast by drawing a film of uniform micron range thickness with a doctor blade. The film was dried in place for 30 seconds at ambient conditions and then immersed in saturated aqueous $CuSO_4$ solution for 160 hours. It was removed from the salt solution as a water-insoluble membrane useful in reverse osmosis processes where it shows a water flux at a delta p of 1,000 psi of 38-50 gal $ft^{-2}$ $day^{-1}$.

A portion of the membrane was then heat-treated for 13 minutes at 175° C. to stabilize the structure. This heat-treated membrane showed a water flux at 1000 psi delta p of 30-50 gal $ft^{-2}$ $day^{-1}$ with improved salt rejection.

The membrane was examined by scanning electron microscopy and observed to have a true asymmetric structure. Its underside was characteristically porous while its top (dense) surface was nonporous at 3,000 and 5,000 magnifications.

EXAMPLE II

The preparation of Example I was repeated three times varying the conditions. In repeat IIa the drying time before salt immersion was 480 seconds, the immersion time was 119 hours and the heat treatment was 10 minutes at 175° C.

In repeat IIb the drying time was 90 seconds, and the immersion time was 185 hours. Heat treatment was 10 minutes at 175° C.

In repeat IIc, the drying time was 90 seconds, the immersion time was 24 hours and the heat treatment was 10 minutes at 175° C.

Comparative Preparation

Example I was repeated twice with the following changes. Instead of drying the film and immersing it in the salt bath, the cast film was directly heat-treated at 175° C. for either 70 or 30 minutes. This produced membranes CP I and CP II. A third membrane CP III was prepared with neither drying, salt immersion nor heat treatment. These membranes were homogeneous in structure rather than asymmetric.

Desalination Performance

The membranes of Examples I and II were tested as reverse osmosis desalination barriers and compared with membranes CP I, CP II and CP III. Water flux and salt rejection values were determined at an applied pressure of 1,000 psi and 30° C.–40° C. The salt rejection performance of the membranes of this invention was slightly superior to the salt rejections of the heat-treated only membranes and far superior to the rejections observed with untreated membranes. These results are shown graphically in the FIGURE. While the salt rejections showed no clear superiority for the present membranes, as compared to the nonasymmetric materials, the water flux data showed the striking differences set out in Table 1. t,0100

EXAMPLE III

The preparation of Example I is repeated using a poly(vinyl alcohol) having an average molecular weight of 86,000. (This and other molecular weights can be determined by gel permeation comparison with polymers of known molecular weight). A similar product, useful as a high flow reverse osmosis membrane, results.

EXAMPLE IV

The preparation of Example I is repeated six times using in place of the copper sulfate solution the following salt solutions.
$ZnCl_2$
$CrCl_2$
$Co(NO_3)_2.6H_2O$
$Pd(NO_3)_2$
$Pt(Cl)_4.8H_2O$
Essentially equivalent asymmetric membranes are achieved.

EXAMPLE V

The preparation of Example I is repeated four times using in place of poly(vinyl alcohol) as polymer the following:
Va 80:20 copoly(vinyl alcohol-vinyl acetate)—50,000 m.w.
Vb poly(ethylene glycol)—150,000 m.w.
Vc poly(ethyleneimine)—45,000 m.w.
Vd poly(vinylamine)—30,000 m.w.
Ve copoly(ethylene vinyl ether-vinyl alcohol)

In each case, essentially equivalent asymmetric reverse osmosis membranes are obtained.

What is claimed is:

1. The method of preparing a thin-skinned asymmetric water-insoluble membrane comprising the steps of:
   (a) casting a layer of water-soluble polymer selected from the group consisting of poly(vinyl alcohol), vinyl acetatevinylalcohol copolymers containing from 25 to 100 mer % of vinyl alcohol groups, water-soluble vinyl alcohol-vinyl ether copolymers, poly(ethyleneimine), poly(vinylpyrrolidone) and poly(vinylamine) from a water solvented casting solution;
   (b) exposing the layer to 15° C. to 100° C. and 25% to 75% humidity for 5 to 2,000 seconds to form a thin-skinned asymmetric-structured film;
   (c) contacting the asymmetric-structured film with an aqueous bath containing from 3 to 40% by weight of a salt of a polyvalent transition metal selected from the metals of Periods 4, 5 and 6 in Groups IVB, VIIB, VIIIB and IIB thereby fixing the thin-skinned asymmetric structure and forming a water-insolubilized film.

2. The method of claim 1 additionally comprising the subsequent step of cross-linking the water insolubilized film.

3. The method of claim 2 wherein the salt of polyvalent transition metal is selected from the group consisting of salts having polyvalent ions of iron, cobalt, nickel, ruthenium, rubidium, palladium, osmium, iridium, platinum, copper, zinc, chromium, manganese and cadmium.

4. The method of claim 3 wherein the layer is from 2 microns to 200 microns thick.

5. The method of claim 4 wherein said contacting is for a period greater than 2 hours.

6. The method of claim 5 wherein the partial evaporating is for a period of 10 to 1000 seconds.

7. The method of claim 6 wherein the cross-linking comprises heat treating at a temperature of from 125° C. to 225° C. and a time of from 2 to 30 minutes.

8. The method for preparing a thin-skinned asymmetric water-insoluble poly(vinyl alcohol) membrane comprising the steps of:

(a) casting an aqueous solution of poly(vinyl alcohol) into a layer;

(b) partially evaporating the aqueous solvent from the layer at a temperature of from 15° C. to 100° C. for from 10 to 1,000 seconds thereby forming a thin-skinned asymmetric structured partially dehydrated film;

(c) contacting said film with an aqueous solution comprising from 5% by weight to saturation copper sulfate, thereby forming a water-insolubilized asymmetric poly(vinyl) alcohol) film;

(d) recovering the water-insolubilized asymmetric poly(vinyl alcohol) film; and (e) cross-linking the water-insolubilized asymmetric poly(vinyl alcohol) film.

9. The method of claim 8 wherein said cross-linking comprises heat treating at 125° C.–225° C. for from 2 to 30 minutes.

10. The method of claim 9 wherein the partial evaporating period is from 20 to 500 seconds, and the contacting is for a period of from 10 to 400 hours.

11. The method of claim 6 wherein the water-soluble polymer is selected from the group consisting of poly(vinyl alcohol) and vinyl acetate-vinyl alcohol copolymers containing from 25 to 100 mer % of vinyl alcohol groups.

12. The method of claim 11 wherein the salt of a polyvalent transition metal is a salt of polyvalent copper.

13. A water-insoluble thin-skinned asymmetric semi-permeable membrane comprising an asymmetric cross-sectioned layer of a water soluble polymer selected from the group consisting of poly(vinyl alcohol), vinyl acetate-vinyl alcohol copolymers containing from 25 to 100 mer % of vinyl alcohol groups vinyl alcohol, water soluble vinyl alcohol-vinyl ether copolymers, poly(ethyleneimine), poly(vinylpyrrolidone) and poly(vinylamine) in complex combination with a water-insolubilizing concentration of polyvalent transition metal ions selected from polyvalent ions of the Period 4, 5 and 6 Group IVB, VIIB, VIIIB and IIB transition metals.

14. The membrane of claim 13 wherein the metal ions are selected from the group consisting of polyvalent ions of iron, cobalt, nickel, ruthenium, rubidium, palladium, osmium, iridium, platinum, copper, zinc, chromium, manganese and cadmium.

15. The membrane of claim 14 wherein the polymer is selected from the group consisting of poly(vinyl alcohol) and vinyl acetate-vinyl alcohol copolymers containing from 25 to 100 mer % of vinyl alcohol.

16. The membrane of claim 15 wherein the organic polymer is poly(vinyl alcohol) and the metal ions are $Cu^{++}$.